United States Patent Office 3,766,209
Patented Oct. 16, 1973

---

3,766,209
METHOD FOR THE PREPARATION OF JUVENILE HORMONE MIMICS
Thomas L. Emmick, Greenfield, Ind., assignor to Eli Lilly and Company, Indianapolis, Ind.
No Drawing. Filed Oct. 8, 1971, Ser. No. 187,891
Int. Cl. C07d 73/00
U.S. Cl. 260—327 M      4 Claims

---

ABSTRACT OF THE DISCLOSURE

Juvenile hormone mimics having the formula

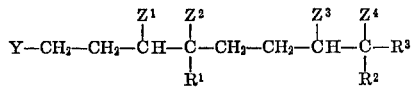

wherein

Y is furyl, thienyl, naphthyl, phenyl or substituted phenyl;
$R^1$, $R^2$ and $R^3$ are each $C_1$–$C_3$ alkyl; and
$Z^1$, $Z^2$, $Z^3$ and $Z^4$ separately are each hydrogen or $Z^1$ and $Z^2$ together and $Z^3$ and $Z^4$ together are a carbon to carbon bond, are prepared from aldehydes having the formula

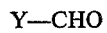

by a three step process involving the preparation of a dithiane from the aldehyde, reaction of the dithiane with an organic halide and removal of the dithiane ring by reduction. Novel substituted dithianes are obtained as intermediates in the process.

BACKGROUND OF THE INVENTION

This invention concerns a method for the preparation of compounds which exhibit juvenile hormone-like activity. More particularly, this invention is concerned with the preparation of compounds comprising a long carbon chain containing at least 11 carbon atoms to which is attached a furan, thiophene, naphthalene, benzene, or substituted benzene ring.

It is well known that insects may be prevented from reaching adulthood by treating a metamorphic stage of the insect with a compound which will prevent passage of the insects to a subsequent metamorphic stage. Naturally occurring compounds which exhibit this activity are known as juvenile hormones. A number of synthetic chemicals possessing this same type of activity have been prepared. Such synthetically prepared compounds are known as juvenile hormone mimics.

One class of juvenile hormone mimics comprises compounds having the chemical structure described above. Heretofore, such compounds have been prepared by means of the Wittig reaction or a Grignard coupling reaction. Both such methods are costly and involve many steps. In addition, a number of desirable substituent groups are sensitive to the conditions employed in the reactions.

SUMMARY

I have now discovered that juvenile hormone mimics of the type described above can be prepared from aldehydes by means of a simple three step process comprising (A) converting the aldehyde to a dithiane by treatment with 1,3-propanedithiol under acidic conditions;

(B) treating the dithiane from step A with an organic halide in the cold in the presence of a suitable base; and (C) removing the dithiane ring by reduction with Raney nickel.

This procedure avoids the use of the expensive reagents employed in the prior art procedures and permits the use of mild conditions under which sensitive groups in the molecule are not affected.

DESCRIPTION OF THE PREFERRED EMBODIMENT

My process for preparing juvenile hormone mimics is depicted by the following series of equations.

(A)
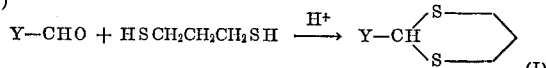

(B)
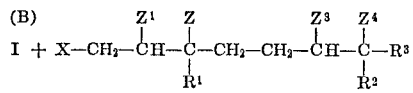

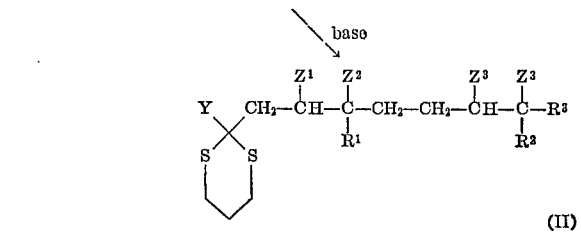

(C)
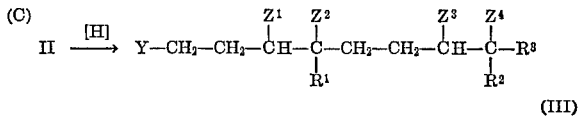

wherein

Y is furyl, thienyl, naphthyl, phenyl or substituted phenyl wherein the substituents are fluoro, chloro, bromo, carboethoxy, cyano, methoxy, ethoxy, methylenedioxy, ethylenedioxy, $C_1$–$C_4$ alkyl, dimethylamino or diethylamino;
X is chlorine or bromine;
each of $R^1$, $R^2$ and $R^3$ is a $C_1$–$C_3$ alkyl group; and
each of $Z^1$, $Z^2$, $Z^3$ and $Z^4$ separately is hydrogen or $Z^1$ and $Z^2$ together and $Z^3$ and $Z^4$ together are a carbon to carbon bond.

In the above formulas Y can be such as 2-furyl, 3-furyl, 2-thienyl, 1-naphthyl, phenyl, 3-chlorophenyl, 3,4-dichlorophenyl, 2-fluorophenyl, 4-bromophenyl, 4-carboethoxyphenyl, 3-cyanophenyl, 3,4-dimethoxyphenyl, 3,4-methylenedioxyphenyl, 4-n-butylphenyl, 3-methylphenyl and 4-dimethylaminophenyl. Each of $R^1$, $R^2$ and $R^3$ is independent of the other and can be, for example, methyl, ethyl, n-propyl or isopropyl.

$Z^1$ and $Z^2$ must be considered as a pair, as must $Z^3$ and $Z^4$. Both members of a pair can be hydrogen or the two members of the pair can form a carbon to carbon bond, resulting in a double bond between the carbon atoms to which the pair are attached. Thus, the carbon skeleton of the side chain can be saturated or it can contain one or two double bonds.

The first step of my process is the well-known reaction of 1,3-propanedithiol with a carbonyl compound to form a 1,3-dithiane. This reaction is used in synthetic organic chemistry as a means of protecting carbonyl groups. The reaction is conducted in the presence of an acid; generally catalytic amounts of the acid are sufficient. I have found p-toluenesulfonic acid to be particularly well suited for this reaction. Other acids that may be used include hydrochloric acid, sulfuric acid, and boron trifluoride etherate. It is understood that not all acids can be used with all aldehydes since some aldehydes undergo decomposition in the presence of certain acids. For example, hydrochloric acid cannot be used with furfural. Skilled chemists will recognize that acids other than those named may be used in the preparation of the dithiane. A simple small-scale run will quickly determine if a particular acid can be used with a particular aldehyde.

The dithiane preparation is driven to completion by removal of the water formed during the reaction. Thus, for best results, means for water removal are provided. A simple means for water removal is to employ a solvent that forms an azeotrope with water and conduct the reaction under refluxing conditions employing a Dean-Stark trap to remove the water. Solvents that form azeotropes with water are well known in the art. A commonly used solvent is benzene. Other hydrocarbons such as toluene and xylene may also be employed.

The water may also be conveniently removed by chemical or other means. For example, if boron trifluoride etherate is employed as the acid, the water will react with the boron trifluoride and be removed in this manner. Magnesium sulfate may be added to the reaction to take up the water formed. Molecular sieves may also be employed to trap the water from the reaction. The particular means of water removal is not critical and is not a part of my invention.

The preparation of the dithiane can be conducted at a temperature within the range of from about 50° to about 150° C. If water is being removed azeotropically, the temperature employed will be the boiling point of the reaction mixture. This will be determined by the choice of azeotroping solvent.

The aldehyde to be reacted with 1,3-propanedithiol is an aldehyde having the formula Y-CHO wherein Y is as defined above. Specific examples of such aldehydes include 2-furfural, 3-furfural, α-thiophenaldehyde, benzaldehyde, 3,4 - methylenedioxybenzaldehyde, 3-methoxybenzaldehyde, 4 - methylbenzaldehyde, 4-chlorobenzaldehyde, 3,4-dichlorobenzaldehyde, 3-bromobenzaldehyde, 3-cyanoethylaminobenzaldehyde. These aldehydes are commercially available or may be readily prepared by known methods for commercially available starting materials.

The first step in my synthesis will be further illustrated by the following example.

Example 1

To a mixture of 30 g. (0.2 mole) of 3,4-methylenedioxybenzaldehyde and 21.8 g. (0.2 mole) of 1,3-propanedithiol in 400 ml. of benzene was added 1.5 g. of p-toluenesulfonic acid. The mixture was heated under reflux for one hour with the water formed being collected in a Dean-Stark trap. The reaction mixture was filtered and washed successively with saturated aqueous sodium bicarbonate solution, water, and saturated aqueous sodium chloride solution. After the solution had been dried over magnesium sulfate, the benzene was removed at 40° C. under reduced pressure. The light yellow solid which remained was recrystallized from a benzene-petroleum ether mixture. Recrystallization afforded 38.5 g. of the desired 2-(3,4-methylenedioxyphenyl)-1,3-dithiane, M.P. 95–96° C.

*Analysis.*—Calculated for $C_{11}H_{12}O_2S_2$ (percent): C, 54.97; H, 5.03. Found (percent): C, 55.15; H, 5.02.

Following the procedure of Example 1 the following dithianes were prepared.

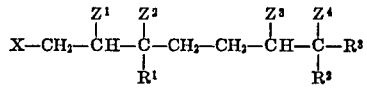

| Y | M.P., °C. |
|---|---|
| (furan-2-yl) | 43–44 |
| (furan-3-yl) | 68–69 |
| (thien-2-yl) | 77–77.5 |
| NC—C₆H₄— | 107–107.5 |
| C₂H₅O₂C—C₆H₄— | 105–107 |
| (CH₃)₂N—C₆H₄— | 121–122 |
| Br—C₆H₄— | 91–92 |
| C₆H₄(Br)— (meta) | 86–87 |
| F—C₆H₄— | 104–105 |
| Cl—C₆H₃(Cl)— | 82–83 |

In the second step of the process, the dithiane form step one is reacted in the presence of a base with an organic halide having the formula $$X-CH_2-\overset{Z^1}{\underset{R^1}{C}H}-\overset{Z^2}{\underset{}{C}}-CH_2-CH_2-\overset{Z^3}{\underset{}{C}H}-\overset{Z^4}{\underset{R^2}{C}}-R^3$$

where X, $R_1$, $R_2$, $R_3$, $Z_1$, $Z_2$, $Z_3$, and $Z_4$ are as defined above. Such a halogen compound may be fully saturated or it may have one or two double bonds. The halides are readily obtained from the corresponding alcohols by known procedures such as treatment with phosphorus trichloride or phosphorus tribromide. Another procedure for preparing the halides is the Stork procedure for preparing geranyl chloride from geraniol, which comprises treating geraniol with butyllithium followed by lithium chloride and p-toluenesulfonyl chloride. The latter procedure allows retention of the stereochemistry of the starting alcohol. Many of the alcohols are naturally occurring compounds such as, for example, geraniol, and others of the alcohols may be prepared by known procedures described in the scientific literature.

The base to be employed in this step is a strong base which is soluble in the medium employed so that a homogeneous mixture is obtained. I have had good results employing a lithium base such as n-butyllithium, lithium diisopropylamide, or the lithium salt of dimethylsulfoxide (lithium methylsulfinylmethide). Those skilled in the art will recognize that there are other bases equivalent to those named which may be employed in this step of my process. The base is preferably used in a stoichiometric amount, with a slight excess of up to about 10 percent being acceptable.

The reaction of the dithiane with the organic halide is conducted in the cold in the presence of an inert solvent. The temperature is preferably kept below 0° C. and more preferably below −10° C. Temperatures as low as −80° C. may conveniently be used. Even lower temperatures may be used but require special cooling equipment and are not necessary. Suitable solvents include ethers such as tetrahydrofuran, dioxane, and ethyleneglycol dimethylether. The solvent should be thoroughly dried and care should be taken to keep the reaction mixture free of water until the reaction is complete.

The second step of my process will be further illustrated by the following examples.

Example 2

A solution of 24 g. (0.1 mole) of 2-(3,4-methylenedioxyphenyl)-1,3-dithiane in 200 ml. of THF (dried over $CaH_2$) was placed under a nitrogen atmosphere and cooled to —30° C. and 50 ml. of a 23 percent solution of n-butyllithium in hexane was added dropwise with stirring. The reaction mixture was stirred for 1.5 hours while maintaining the temperature below —10° C. A solution of 17.3 g. of trans-1-chloro-3,7-dimethyl-2,6-octadiene in 100 ml. of THF (dried over $CaH_2$) was then added dropwise with stirring. The reaction mixture was maintained at 0° C. for 70 hours. After acidification of a pH of 6 the reaction mixture was poured into 600 ml. of water. The resulting heterogeneous mixture was extracted three times with petroleum ether, the extracts were combined, washed with saturated aqueous sodium bicarbonate solution, water, and brine, and dried over magnesium sulfate. After evaporation of the petroleum ether there was obtained 30 g. of a light yellow oil. Purification was achieved by chromatographing 15 g. of the oil over 500 g. of silica gel using benzene as the eluent. Fourteen grams of the desired trans - 2 - (3,7-dimethyl-2,6-octadienyl)-2-(3,4-methylenedioxyphenyl)-1,3-dithiane was obtained. The structure was confirmed by nuclear magnetic resonance spectroscopy.

Other compounds of Formula II prepared by the procedure of Example 2 were those in which Y is 2-furyl, 3-furyl, 2-thienyl, 4-dimethylaminophenyl, 4-fluorophenyl, and 3,4-dichlorophenyl.

Example 3

A solution of 4.5 g. (51 mmoles) of diisopropylamine in 100 ml. of THF (distilled from $LiAlH_4$) was cooled to —30° C. under an atmosphere of nitrogen. To this cold solution was added dropwise with stirring 23 ml. of a 24 percent solution of n-butyllithium in hexane. A solution of 11.0 g. (50 mmoles) of 2-(4-cyanophenyl)-1,3-dithiane in 50 ml. of THF was added dropwise with stirring at —25° to —30° C. The reaction mixture was stirred at —20° to —40° C. for two hours. Trans-1-chloro-3,7-dimethyl-2,6-octadiene (8.6 g., 50 mmoles) in 50 ml. THF was added dropwise with stirring at —30° C. After the reaction mixture had been stirred for one hour at about —75° C., it was poured into twice its volume of water. The aqueous phase was twice extracted with petroleum ether and the extracts were combined and washed successively with saturated aqueous sodium bicarbonate solution, water and brine. After drying over magnesium sulfate the petroleum ether was evaporated, leaving 16 g. of a light yellow oil. The oil was purified by chromatography over 400 g. of silica gel using benzene as the eluent. Ten grams of the desired trans-2-(4-cyanophenyl)-2-(3,7-dimethyl-2,6-octadienyl)-1,3-dithiane was obtained pure as shown by n.m.r.

Using the same procedure trans-2-(4-carboethoxyphenyl)-2-(3,7-dimethyl-2,6-octadienyl)-1,3-dithiane was obtained from 2-(4-carboethoxyphenyl)-1,3-dithiane.

Example 4 n-Butyllithium, 13 ml. of a 23 percent solution in hexane, was added dropwise with stirring to 13 ml. of dry dimethyl sulfoxide maintained under an atmosphere of nitrogen. The resulting $LiCH_2SOCH_3$ was added dropwise with stirring to 7.0 g. (25 mmoles) of 2-(3-bromophenyl)-1,3-dithiane in 130 ml. of THF (dried over $CaH_2$) maintained at —30° C. under nitrogen. Stirring at —30° C. was continued for two hours. Trans-1-chloro-3,7-dimethyl-2,6-octadiene (4.3 g., 25 mmoles) in 30 ml. of THF was added at —30° C. The mixture was stirred while being allowed to slowly warm to room temperature overnight. The mixture was poured into twice its volume of ice water and extracted with ether. The ether extract was washed with brine and dried over magnesium sulfate. Removal of the ether at 40° C. under vacuum afforded 12 g. of an oil. Five grams of the oil was purified by chromatography over 100 g. of silica gel, eluting with 1:1 benzene-petroleum ether. Three grams of pure trans- 2 - (4 - bromophenyl) - 2 - (3,7-dimethyl-2,6-octadienyl)-1,3-dithiane was obtained as confirmed by n.m.r.

The corresponding 4-bromophenyl compound was also prepared by this procedure.

The final step of the process is the cleavage of the dithiane ring to yield the desired product. Removal of the dithiane ring is accomplished by reduction. Raney nickel is an excellent reducing agent for this cleavage. The dithiane is cleaved by Raney nickel without reducing double bonds present in the molecule. Those skilled in the art will recognize that there are other reducing agents which will accomplish this reduction.

The Raney nickel reduction is preferably run at room temperature although slightly lower or slightly higher temperatures such as 10° to 50° C. may be employed. The reduction is also preferably run in an inert solvent such as ethanol. The Raney nickel reduction will be illustrated by Example 5.

Example 5

A mixture of 5.0 g. (12.4 mmoles) of trans-2-(4-carboethoxyphenyl) - 2 - (3,7-dimethyl-2,6-octadienyl)-1,3-dithiane and 48 ml. of settled Raney nickel in 500 ml. of anhydrous ethanol was stirred at room temperature for three hours. The Raney nickel was removed by filtration and washed extensively with anhydrous ethanol. The alcohol was removed at 50° C. under vacuum, the residue dissolved in petroleum ether, and the petroleum ether solution washed successively with water and brine. After drying over magnesium sulfate, the petroleum ether was removed at 40° C. under vacuum, leaving 3.4 g. of a colorless oil. The oil was purified by chromatography over 70 g. of silica gel, eluting with 1:1 benzene-petroleum ether. Three grams of spectroscopically (n.m.r.) and gas chromatographically pure ethyl trans-4-(4,8-dimethyl-3,7-nonadienyl)benzoate was obtained.

Other compounds of Formula III prepared in this manner were those in which Y is 2-furyl, 3-furyl, 2-thienyl, 4-cyanophenyl, 4-dimethylaminophenyl, 4-bromophenyl, 3-bromophenyl, 4-fluorophenyl, 3,4-dichlorophenyl and 3,4-methylenedioxyphenyl.

The compounds prepared by my process possess juvenile hormone-like activity and may be used to control insect populations. The compounds are effective when applied topically or when ingested by the insects. The compounds prevent treated insects from reaching sexual maturity, thereby preventing reproduction by the insect.

The dithiane intermediates obtained in the second step of my process are novel compounds. They are useful as intermediates in the preparation of juvenile hormone mimics in the manner described. My novel substituted dithiane compounds have the formula

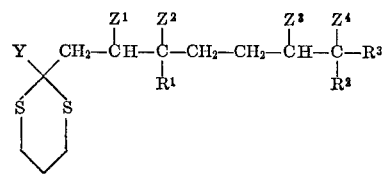

wherein

Y is furyl, thienyl, naphthyl, phenyl or substituted phenyl wherein the substituents are fluoro, chloro, bromo, carboethoxy, cyano, methoxy, ethoxy, methylenedioxy, ethylenedioxy, $C_1$–$C_4$ alkyl, dimethylamino or diethylamino;

each of $R^1$, $R^2$ and $R^3$ is a $C_1$–$C_3$ alkyl group; and

I claim:

1. A method for the preparation of a compound having the formula

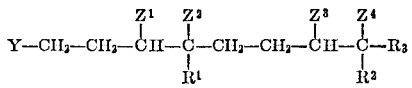

wherein

Y is furyl, thienyl, naphthyl, phenyl or substituted phenyl wherein the substituents are fluoro, chloro, bromo, carboethoxy, cyano, methoxy, ethoxy, methylenedioxy, ethylenedioxy, $C_1$–$C_4$ alkyl, dimethylamino or diethylamino;

each of $R^1$, $R^2$ and $R^3$ is $C_1$–$C_3$ alkyl; and each of $Z^1$, $Z^2$, $Z^3$ and $Z^4$ separately is hydrogen or $Z^1$ and $Z^2$ together and $Z^3$ and $Z^4$ together are a carbon to carbon bond;

which comprises:

(A) condensing an aldehyde having the formula Y—CHO wherein Y is as defined above with 1,3-propanedithiol under acid conditions at a temperature within the range of 50° to 150° C. to form the dithiane;

(B) treating the dithiane from (A) with an organic halide having the formula

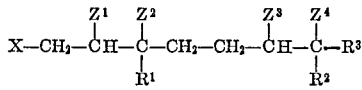

wherein $R^1$, $R^2$, $R^3$, $Z^1$, $Z^2$, $Z^3$ and $Z^4$ are as defined above and X is chlorine or bromine, at a temperature within the range of −80° to 0° C. in the presence of a base selected from n-butyllithium, lithium diisopropylamide, and lithium methylsulfinylmethide to form a compound having the formula

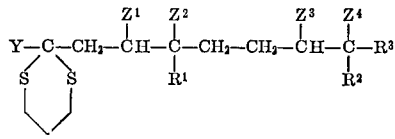

and (C) treating the product from (B) with Raney nickel at a temperature within the range of 10° to 50° C. to cleave the dithiane ring and yield the desired product.

2. A method as in claim 1 wherein Y is 3,4-methylenedioxyphenyl; $R^1$, $R^2$ and $R^3$ are each methyl; $Z^1$ and $Z^2$ together are a carbon to carbon bond; and $Z^3$ and $Z^4$ together are a carbon to carbon bond.

3. A substituted dithiane having the formula

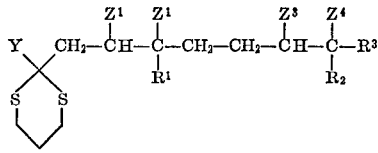

wherein

Y is furyl, thienyl, naphthyl, phenyl or substituted phenyl wherein the substituents are fluoro, chloro, bromo, carboethoxy, cyano, methoxy, ethoxy, methylenedioxy, ethylenedioxy, $C_2$–$C_4$ alkyl, dimethylamino or diethylamino;

each of $R^1$, $R^2$ and $R^3$ is a $C_1$–$C_3$ alkyl group; and each of $Z^1$, $Z^2$, $Z^3$ and $Z^4$ separately is hydrogen or $Z^1$ and $Z^2$ together and $Z^3$ and $Z^4$ together are a carbon to carbon bond.

4. A dithiane as in claim 3 wherein Y is 3,4-methylenedioxyphenyl; $R^1$, $R^2$ and $R^3$ are each methyl; $Z^1$ and $Z^2$ together are a carbon to carbon bond; and $Z^3$ and $Z^4$ together are a carbon to carbon bond.

References Cited

UNITED STATES PATENTS 2,701,253    2/1955    Jones et al. _____ 260—327

OTHER REFERENCES

Seebach et al.: Angew. Chem., Intern. Ed. Engl., 1968, 7 (8), 619–20.

Fieser et al.: Advanced Org. Chem. (Reinhold, N.Y., 1961), pp. 442–3.

Roberts et al.: Basic Principles of Org. Chem. (Benjamin, N.Y. 1964), pp. 459–50.

Corey et al.: Angew. Chem., Intern. Ed. Engl., 4 (12), 1075–77 (1965).

Reece et al.: Teterahedron 1968: 24 (11), 4249–56.

HENRY R. JILES, Primary Examiner

C. M. S. JAISLE, Assistant Examiner

U.S. Cl. X.R.

260—329 HS, 329 R, 340.3, 240.5, 346.1, 465, 476 R, 577, 612 D, 650 R, 650 F, 671 A; 424—275, 278, 282, 285, 304, 308, 330, 340, 341, 353, 356

PO-1050
(5/69)

UNITED STATES PATENT OFFICE
CERTIFICATE OF CORRECTION

Patent No. 3,766,209          Dated October 16, 1973

Inventor(s) Thomas L. Emmick

It is certified that error appears in the above-identified patent and that said Letters Patent are hereby corrected as shown below:

In column 1, line 45, "insects" should read ---insect---

In column 3, line 50, delete "ethylaminobenzaldehyde." and insert ---benzaldehyde, 4-dimethylaminobenzaldehyde and 4-diethylaminobenzaldehyde.---

In column 3, line 52, "for" should read ---from---.

In column 4, line 37, "form" should read ---from---.

In column 4, line 44, "$R_1$, $R_2$, $R_3$, $Z_1$, $Z_2$, $Z_3$, and $Z_4$" should read ---$R^1$, $R^2$, $R^3$, $Z^1$, $Z^2$, $Z^3$, and $Z^4$---.

In column 7, line 9, at the end of the structure, "$R_3$" should read ---$R^3$---.

In column 8, line 17, "$C_2$-$C_4$" should read ---$C_1$-$C_4$---.

Signed and sealed this 30th day of April 1974.

(SEAL)
Attest:

EDWARD M.FLETCHER,JR.
Attesting Officer

C. MARSHALL DANN
Commissioner of Patents